United States Patent
Belvin et al.

(10) Patent No.: US 9,564,037 B2
(45) Date of Patent: Feb. 7, 2017

(54) MOBILE DEVICE LOSS PREVENTION USING AUDIO AND SPATIAL INDICIA

(71) Applicant: International Business Machines Corporation, Armonk, NY (US)

(72) Inventors: Marcus L. Belvin, Raleigh, NC (US); Matthew C. Hillary, Tyler, TX (US); Benjamin I. Rubinger, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 14/718,985

(22) Filed: May 21, 2015

(65) Prior Publication Data
US 2016/0343235 A1    Nov. 24, 2016

(51) Int. Cl.
| | |
|---|---|
| G08B 21/00 | (2006.01) |
| G08B 21/24 | (2006.01) |
| H04W 4/02 | (2009.01) |
| H04L 29/08 | (2006.01) |

(52) U.S. Cl.
CPC ............ *G08B 21/24* (2013.01); *H04L 67/303* (2013.01); *H04W 4/025* (2013.01)

(58) Field of Classification Search
CPC combination set(s) only.
See application file for complete search history.

(56) References Cited

U.S. PATENT DOCUMENTS

| | | | |
|---|---|---|---|
| 7,890,083 B2 | 2/2011 | Chandran | |
| 7,973,655 B2 | 7/2011 | Blinnikka et al. | |
| 2009/0135002 A1 | 5/2009 | Blinnikka et al. | |
| 2010/0178913 A1* | 7/2010 | Herbert | G08B 13/1427 455/426.1 |

(Continued)

FOREIGN PATENT DOCUMENTS

WO    2012091647 A1    7/2012

OTHER PUBLICATIONS

Chen Hui Ong, et al., Proactive Detection and Recovery of Lost Mobile Phones, Article, 2005, pp. 1-7, MIT, Published online at: http://hdl.handle.net/1721.1/7432.

(Continued)

*Primary Examiner* — Travis Hunnings
(74) *Attorney, Agent, or Firm* — Lee Law, PLLC; Christopher B. Lee (57) ABSTRACT

A processor of a first loss-prevention configured mobile device detects a second loss-prevention configured mobile device in proximity of the first loss-prevention configured mobile device. Responsive to detecting the first and the second loss-prevention configured mobile devices in proximity, spatial separation of the first loss-prevention configured mobile device from the second loss-prevention configured mobile device beyond a configured separation distance is detected. A voice of an owner of the second loss-prevention configured mobile device is detected at the first loss-prevention configured mobile device located beyond the configured separation distance. An alert is generated at the first loss-prevention configured mobile device that indicates that the owner of the second loss-prevention configured mobile device is separated from the second loss-prevention configured mobile device.

20 Claims, 5 Drawing Sheets

(56) References Cited

U.S. PATENT DOCUMENTS

| | | |
|---|---|---|
| 2011/0285535 A1 | 11/2011 | Barwin |
| 2012/0214436 A1 | 8/2012 | Clark et al. |
| 2012/0237908 A1 | 9/2012 | Fitzgerald et al. |
| 2013/0040600 A1 | 2/2013 | Reitnour et al. |
| 2015/0078574 A1* | 3/2015 | Shin .................. H04R 1/1091 381/74 |

OTHER PUBLICATIONS

Hyojeong Shin, et al., Finding MiMo: Tracing a Missing Mobile Phone Using Daily Observations, Proceedings of the 9th International Conference on Mobile Systems, Applications, and Services, Nov. 30, 2011, pp. 29-42, ACM, New York, NY, USA.

IBM, A Method of Intercommunication Between Groups of Personal Items to Prevent Loss, Technical Disclosure IPCOM000180988D, Mar. 23, 2009, pp. 1-7, IBM Corporation, Published online at: http://ip.com/IPCOM/000180988.

Simon Constable, digits: Stop Losing Your Cell Phone, Live Video Clip, Apr. 14, 2010, p. 1 (Screenshot), The Wall Street Journal, Published/viewable online at: http://live.wsj.com/video/digits-stop-losing-your-cell-phone/8078C3E6-7F86-4D76-BF8A-FC8643D48BC9.html#!8078C3E6-7F86-4D76-BF8A-FC8643D48BC9.

Author Unknown, Reusable, Rechargeable CharlieCards and CharlieTickets, MBTA Website, Printed from website on May 19, 2015, pp. 1-3, Massachusetts Bay Transportation Authority, Published online at: http://www.mbta.com/fares_and_passes/charlie.

Author Unknown, Smart key, Wikipedia.com website, Mar. 23, 2015, pp. 1-8, Wikimedia Foundation, Inc., Published online at: http://en.wikipedia.org/wiki/Smart_key.

Author Unknown, What is expresspay?, Archived Website, May 30, 2013, p. 1, American Express Company, Archived at https://web.archive.org/web/20130711022645/http://www.americanexpress.com/expresspay (with redirect to: https://web.archive.org/web/20130530041104/https://www295.americanexpress.com/cards/loyalty.do?page=expresspay).

* cited by examiner

MOBILE DEVICE LOSS PREVENTION USING AUDIO AND SPATIAL INDICIA

BACKGROUND

The present invention relates to prevention of mobile device loss. More particularly, the present invention relates to mobile device loss prevention using audio and spatial indicia.

Mobile devices allow users to communicate with one another without being situated in a fixed location, which was not possible by use of older "land-line" phones. Mobile devices also have advanced to provide more features to users, including applications (e.g., "Apps" for short) that provide the users with more utilities, games, and other benefits.

SUMMARY

A method includes detecting, via a processor of a first loss-prevention configured mobile device, a second loss-prevention configured mobile device in proximity of the first loss-prevention configured mobile device; detecting, responsive to detecting the first and the second loss-prevention configured mobile devices in proximity, spatial separation of the first loss-prevention configured mobile device from the second loss-prevention configured mobile device beyond a configured separation distance; detecting, at the first loss-prevention configured mobile device located beyond the configured separation distance, a voice of an owner of the second loss-prevention configured mobile device; and generating an alert at the first loss-prevention configured mobile device that indicates that the owner of the second loss-prevention configured mobile device is separated from the second loss-prevention configured mobile device.

A system that performs the method and a computer program product that causes a computer to perform the method are also described.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides mobile device loss prevention using audio and spatial indicia. The present technology solves a recognized mobile device loss problem by providing technology that includes a new form of mobile device that operates, either alone or in conjunction with a new form of server device, to detect that a user of a mobile device has moved away from the user's own mobile device under circumstances that may result in the user losing the user's own mobile device. The present technology utilizes audio/voice detection and processing at mobile devices of friends of an owner that has left a mobile device behind at a location where the friends were gathering, in conjunction with geographic location processing of mobile devices to detect the circumstances that may result in the user losing the user's own mobile device. The mobile device of the friend generates an appropriate alert indicating that the owner's mobile device has been left behind. The owner may then retrieve their mobile device before it is actually lost. As such, the present technology operates to prevent mobile device loss. The mobile devices may be configured as loss-prevention mobile devices, as described further below.

Either a loss-prevention server or the loss-prevention configured mobile devices themselves detect a first loss-prevention configured mobile device and a second loss-prevention configured mobile device in proximity of each other. Responsive to detecting the first and second loss-prevention configured mobile device in proximity to each other, spatial separation of the second loss-prevention configured mobile device from the first loss-prevention configured mobile device beyond a configured separation distance is detected. A voice of an owner of the second loss-prevention configured mobile device that is located beyond the configured separation distance from the first loss-prevention configured mobile device is detected at the first loss-prevention configured mobile device. An alert is generated at the first the loss-prevention configured mobile device that indicates that the owner of the second loss-prevention configured mobile device is separated from the second loss-prevention configured mobile device.

As such, the present technology detects when one or more mobile devices of "friends" come into close proximity with one another for an extended period of time, such as where the respective mobile device users are meeting for lunch at a restaurant. After detecting that the mobile devices of the friends are in close proximity, monitoring is initiated to detect when the mobile devices become separated, such as by measuring a geographic distance between and/or locations of the mobile devices. When it is determined that the devices have become physically separated, the mobile devices begin monitoring for a voice signatures of other friends that own different mobile devices using voice recognition technology. If an owner of a different mobile device is detected by a mobile device of a friend while the two devices are physically separated spatially, it is determined that the owner does not have their own mobile device and has left it behind. The system may trigger an alert (e.g., audio and/or text) to the friend's mobile device indicating that the recognized owner of the other mobile device has left their own mobile device behind.

The present technology may prevent loss of mobile devices by alerting mobile devices of friends to instruct the owner of the mobile device that was left behind to retrieve their mobile device before it is lost. The present technology allows a user/owner of a mobile device to have a near-immediate notification that the mobile device has been misplaced. This notification may prevent loss because the user/owner will likely still be in the same geographic area where the mobile device was left behind, which thereby makes the retrieval process much more efficient.

Additionally, post-loss tracking of the mobile device is not needed because the mobile device loss has been prevented under these circumstances. It should be understood that the term "loss" of a mobile device as utilized herein (and as prevented as described) refers to a situation where the user/owner is unable to retrieve their mobile device, such as where the device is stolen or left in a location for a duration of time such that the user does not know or cannot determine where the mobile device may have been left. As such, inadvertently and temporarily misplacing a mobile device that may be recovered by use of the technology described herein is not considered a "loss" situation. Accordingly, the present technology prevents "loss" of a mobile device as defined herein, because the user may be notified of the inadvertent misplacement of the mobile device via the user's friend's mobile device while the user/owner may still be able to determine/know where to look for the mobile device and may still be able to immediately retrieve the mobile device before it becomes formally "lost."

The "friends" for which loss-prevention alerts may generated may be configured by use of a loss-prevention friends profile. It is understood that for purposes of the present description, one or more "profiles" may be configured as appropriate for a given implementation and that use of multiple profiles or a single "profile" is considered interchangeable for purposes of the present description. The loss-prevention friends profile(s) may be configured by a set of friends that each register for loss-prevention alerts. Multiple categories of friends may also be configured. For example, a list of coworkers with whom the owner may be likely to spend time during the workday may be configured. Additionally, lists of family and lists of personal friends with whom the owner would be likely to spend time after work may be configured. The loss-prevention friends profiles may be stored within each device or may be stored within a central server for network-level control and processing of mobile device loss prevention.

The friends may also each configure voice recognition samples within the loss-prevention friends profiles for use in detection of owners that are spatially separated from their own mobile devices. Particular words, phrases, or sentences may be configured within the loss-prevention friends profiles (e.g., "It was good to see you again" or particular words of such a phrase), or frequency-based processing of voice samples/profiles of the friends may be used. Additionally, any other form of voice recognition technology may be used as appropriate for a given implementation.

Further regarding details of the processing to detect proximity and separation of the mobile devices of the friends, the period of time during which friends may be determined to be in close proximity with one another and trigger monitoring may also be configured within and determined by use of the loss-prevention friends profiles. Further, the distance by which the respective devices may be determined to be physically separated and trigger an alert may also be configured within the loss-prevention friends profiles. The configured period of time and the configured distance of physical separation may be used to avoid triggering monitoring and alerts under circumstances where it is unlikely that a user would leave their mobile device behind, such as during a brief conversation while passing one another in a hallway.

Additionally, after detecting that the mobile devices of the friends are in close proximity, the mobile devices of the user and the friend(s) (either individually or in conjunction with a central server) may be placed into a state to detect when the mobile devices become separated and to detect the locations of the respective devices. The detection of the mobile device proximity and the separation distances may be performed by measuring a geographic distance between and/or locations of the mobile devices, such as by use of global positioning system (GPS) distance/location coordinate measurements/differences.

It should be noted that the present technology may detect when one user has left their mobile device behind, and may also detect when two or more users have inadvertently picked up each other's mobile device after meeting together. For purposes of the following example, one device is considered "stationary" and the other device is considered to be "moving." However, it is understood that both devices may be moving if each user has inadvertently picked up the mobile device of another user and the users are moving away from one another.

When it is determined that the devices have become separated and that one of the mobile devices is stationary (or moving in a different direction), the mobile device of the user that is moving is set to actively listen, using voice recognition technology, for the user of the mobile device that is stationary (or moving in a different direction). If the user of the mobile device that is stationary is detected to be near the mobile device that is moving while that mobile device is moving away from the other mobile device, the system may trigger an event to notify the moving mobile device that the mobile device of the other user has been left behind.

In such a situation, either the friend of the user that left their mobile device behind, or the friend that inadvertently picked up the other friend's mobile device, may receive the alert. In the case where two or more friends inadvertently pick up each other's mobile devices, each mobile device that detects the voice of a different user (other than the owner of the mobile device) may generate the appropriate alert, and each user may quickly be alerted that they have the wrong mobile device so that the users may coordinate exchange of mobile devices to reunite the owners with their own mobile devices. Where a single mobile device user has left a mobile device behind, the friend that receives the alert may notify the user to retrieve their mobile device before they leave, which may prevent loss of the mobile device.

It is recognized that there may be some circumstances where an owner is legitimately separated from a mobile device, such as when the owner allows a friend to borrow the mobile device. To prevent false positives and generation of alerts in such authorized circumstances, one or more device lending rules may be configured to manage such circumstances. For example, a device lending rule may be configured that specifies that if the mobile device is already engaged in a voice call when separated from the owner or if a phone number in a configured phone book is selected, the mobile device should not be considered "separated." Other forms of device lending rules are possible, and all such possibilities are considered to be within the scope of the present subject matter.

It should be noted that conception of the present subject matter resulted from recognition of certain limitations associated with the mobility aspect of mobile devices. For example, it was observed that, while "smart phones" are easy for a user to carry around, the smart phones have become expensive due to increased features, such as high resolution cameras and touch screen displays. It was additionally observed that, while a typical smart phone owner/user almost always takes the smart phone to different places throughout a typical day, the smart phone is often the most expensive asset that owner carries from place to place. Additionally, it was observed that smart phones are also prone to being lost due to their small sizes and users' tendencies to interact with the smart phones while they are "on the go," resulting in the smart phones being taken out of the owner's belongings (e.g., pockets, purses, carry bags, etc.) and being placed on tables, on seats, or in other locations where the smart phones may be more easily and readily accessible to the user. These tendencies create instances where these devices may be left behind, and ultimately lost if the last location of use is forgotten or if someone else finds the smart phone and does not return the smart phone to the user. In view of these several observations, it was determined that technology to automatically and proactively alert a list of the device owner's friends that she or he is separated from her or his mobile device may prevent loss of the mobile device and improve the likelihood of recovery of the device. The present subject matter improves mobile device loss prevention by providing for use of audio and geographic difference indicia to detect circumstances where a user has inadvertently left a mobile device behind, as described above and in more detail below. As such, improved mobile device loss prevention may be obtained through use of the present technology.

The mobile device loss prevention using audio and spatial indicia described herein may be performed in real time to allow prompt alerts to friends of mobile device users in circumstances where a user has left a mobile device behind in a location where the user was gathered with friends. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
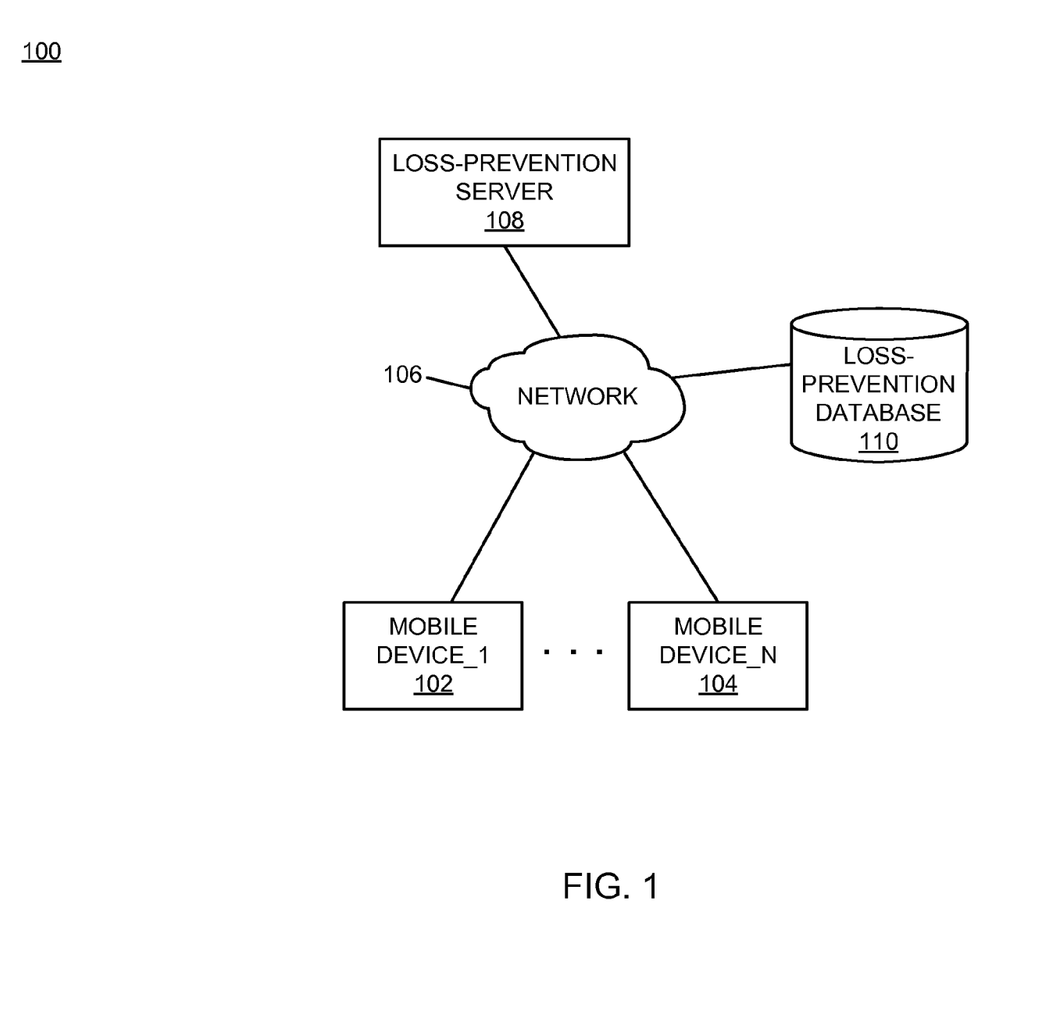
FIG. 1 is a block diagram of an example of an implementation of a system for mobile device loss prevention using audio and spatial indicia according to an embodiment of the present subject matter.

FIG. 1 is a block diagram of an example of an implementation of a system 100 for mobile device loss prevention using audio and spatial indicia. A mobile device_1 102 through a mobile device_N 104 communicate via a network 106. A loss-prevention server 108 provides configuration and loss prevention services within the system 100. As described above, the individual mobile devices 102 through 104 or the loss-prevention server 108 may perform the respective monitoring, detection, and notification activities described herein to prevent loss of mobile devices by their respective owners, either individually or in combination with other of the respective devices. A loss-prevention database 110 provides networked storage for loss-prevention friends profiles, as described above. As also described above, the loss-prevention friends profiles may include mobile device identifiers (IDs) and voice samples of friends of an owner of a given mobile device, and may include device lending rules.

As will be described in more detail below in association with FIG. 2 through FIG. 5, the mobile device_1 102 through the mobile device_N 104 may each provide automated mobile device loss prevention using audio and spatial indicia. The automated mobile device loss prevention using audio and spatial indicia is based upon detection of a voice of an owner of a mobile device in proximity to a mobile device of a friend of the owner, where the owner is also physically separated from the owner's mobile device.

The present technology may be implemented at a user mobile device level or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The loss-prevention server 108 may include any device capable of providing data for consumption by a device, such as the mobile device_1 102 through the mobile device_N 104, via a network, such as the network 106. As such, the loss-prevention server 108 may include a web server, an application server, or other data server device.

The loss-prevention database 110 may include a relational database, an object database, or any other storage type of device. As such, the loss-prevention database 110 may be implemented as appropriate for a given implementation.

Figure 2:
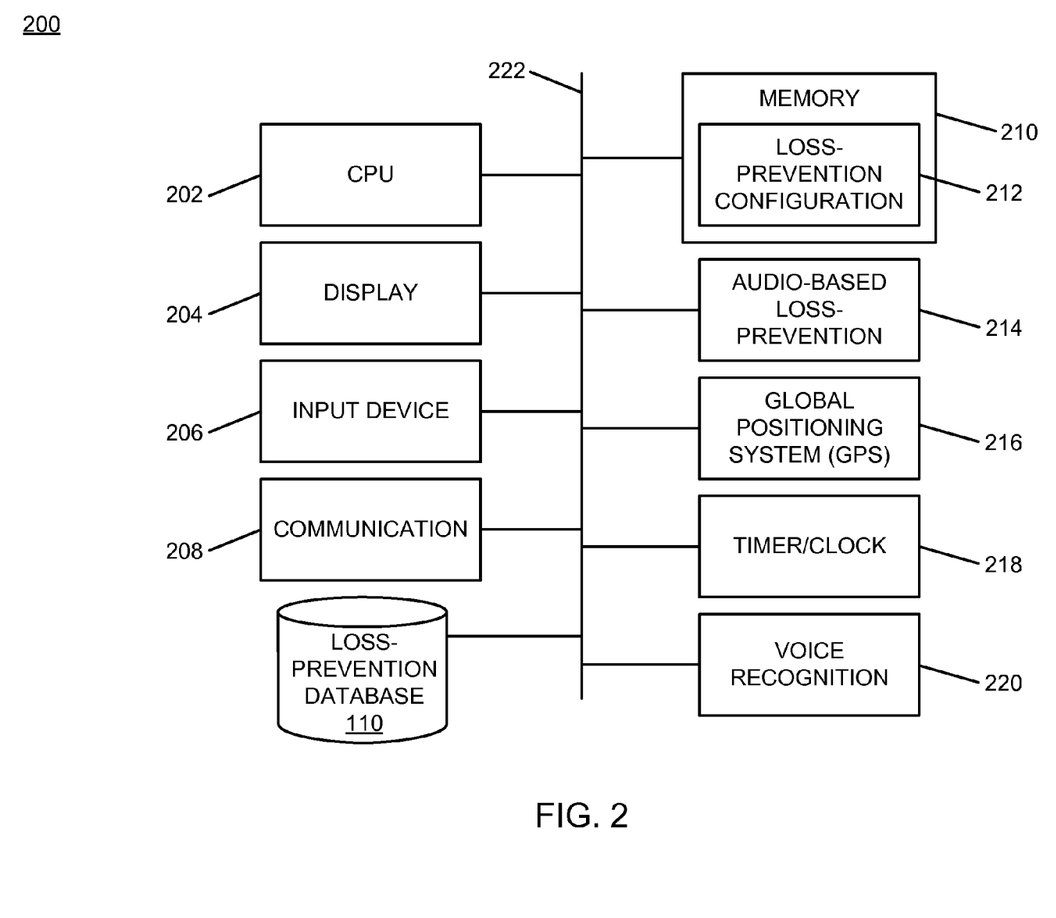
FIG. 2 is a block diagram of an example of an implementation of a core processing module capable of performing mobile device loss prevention using audio and spatial indicia according to an embodiment of the present subject matter.

FIG. 2 is a block diagram of an example of an implementation of a core processing module 200 capable of performing mobile device loss prevention using audio and spatial indicia. The core processing module 200 may be associated with either the mobile device_1 102 through the mobile device_N 104 or with the loss-prevention server 108, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of mobile device loss prevention in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204. The input device 206 may also include a microphone usable to capture spoken audio from persons in proximity to a mobile device where implemented in association with one or more of the mobile device_1 102 through the mobile device_N 104. The microphone may be used to capture and create voice samples/profiles of friends, and may be used to detect voices of owners of mobile devices while the owner's mobile device is not with the owner, as described above and in more detail below.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a loss-prevention configuration storage area 212 that stores configuration information for prevention of mobile device loss within the core processing module 200. For example, the loss-prevention information stored within the loss-prevention configuration storage area 212 may include loss-prevention friends profiles including mobile device identifiers (IDs) and voice samples/profiles of friends of an owner of a given mobile device, and may include device lending rules, and other information as appropriate for a given implementation. As will be described above and in more detail below, loss-prevention information stored within the loss-prevention configuration storage area 212 is used to detect circumstances under which a user may have inadvertently left a mobile device behind after meeting with friends or colleagues, and may generate alerts to friends of the owner that left the device behind in response to detecting the owner's voice at a mobile device of the friend to avoid/prevent actual loss of the mobile device.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An audio-based loss-prevention module 214 is also illustrated. The audio-based loss-prevention module 214 provides mobile device proximity and audio/voice detection for the core processing module 200, as described above and in more detail below. The audio-based loss-prevention module 214 implements the automated mobile device loss prevention using audio and spatial indicia of the core processing module 200.

It should also be noted that the audio-based loss-prevention module 214 may form a portion of other circuitry described without departure from the scope of the present subject matter. Further, the audio-based loss-prevention module 214 may alternatively be implemented as an application stored within the memory 210 that operates to interact with and/or control the various hardware components described herein. The audio-based loss-prevention module 214 may form a portion of an interrupt service routine (ISR), a portion of an operating system, a portion of a browser application, or a portion of a separate application without departure from the scope of the present subject matter.

A global positioning system (GPS) module 216 provides positioning location coordinates usable for identifying proximity and subsequent lack of proximity of the mobile devices 102 through 104. Location identification information generated by the GPS module 216 may be stored within the memory 210 and/or the loss-prevention configuration storage area 212 for use by the audio-based loss-prevention module 214.

A timer/clock module 218 is illustrated and used to determine timing and date information, such as configured durations of proximity of the mobile devices 102 through 104, as described above and in more detail below. As such, the audio-based loss-prevention module 214 may utilize information derived from the timer/clock module 218 for information processing activities, such as the mobile device loss prevention using audio and spatial indicia.

A voice recognition module 220 is also illustrated and provides voice detection and identification of voice audio from particular friends that are configured within a loss-prevention profile. The identification of voice audio from particular friends may be performed by comparison of detected voice audio with voice samples/profiles stored within the loss-prevention profile. As such, output from the voice recognition module 220 may be utilized by the audio-based loss-prevention module 214 in conjunction with output from the GPS module 216 to determine that a voice of a mobile device owner is detected near a mobile device of a friend of the owner, where the two mobile devices have become physically/spatially separated (e.g., the owner has forgotten their mobile device and has left their mobile device behind). For example, using the voice recognition module 220, the audio-based loss-prevention module 214 may capture and identify a voice of a friend of a particular mobile device user, where the mobile device and thereby the friend has been also determined to be geographically moving away from a location of the friend's own mobile device. As described above, the audio-based loss-prevention module 214 may generate a notification that allows the owner to retrieve their mobile device before it is formally lost.

The loss-prevention database 110 is again shown within FIG. 2 associated with the core processing module 200. As such, the loss-prevention database 110 may be operatively coupled to the core processing module 200 without use of network connectivity, as appropriate for a given implementation.

The CPU 202, the display 204, the input device 206, the communication module 208, the memory 210, the audio-based loss-prevention module 214, the GPS module 216, the timer/clock module 218, the voice recognition module 220, and the loss-prevention database 110 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the loss-prevention database 110 is illustrated as a separate component for purposes of example, the information stored within the loss-prevention database 110 may also/alternatively be stored within the memory 210 without departure from the scope of the present subject matter. Accordingly, the core processing module 200 may take many forms and may be associated with many platforms.

Figure 3:
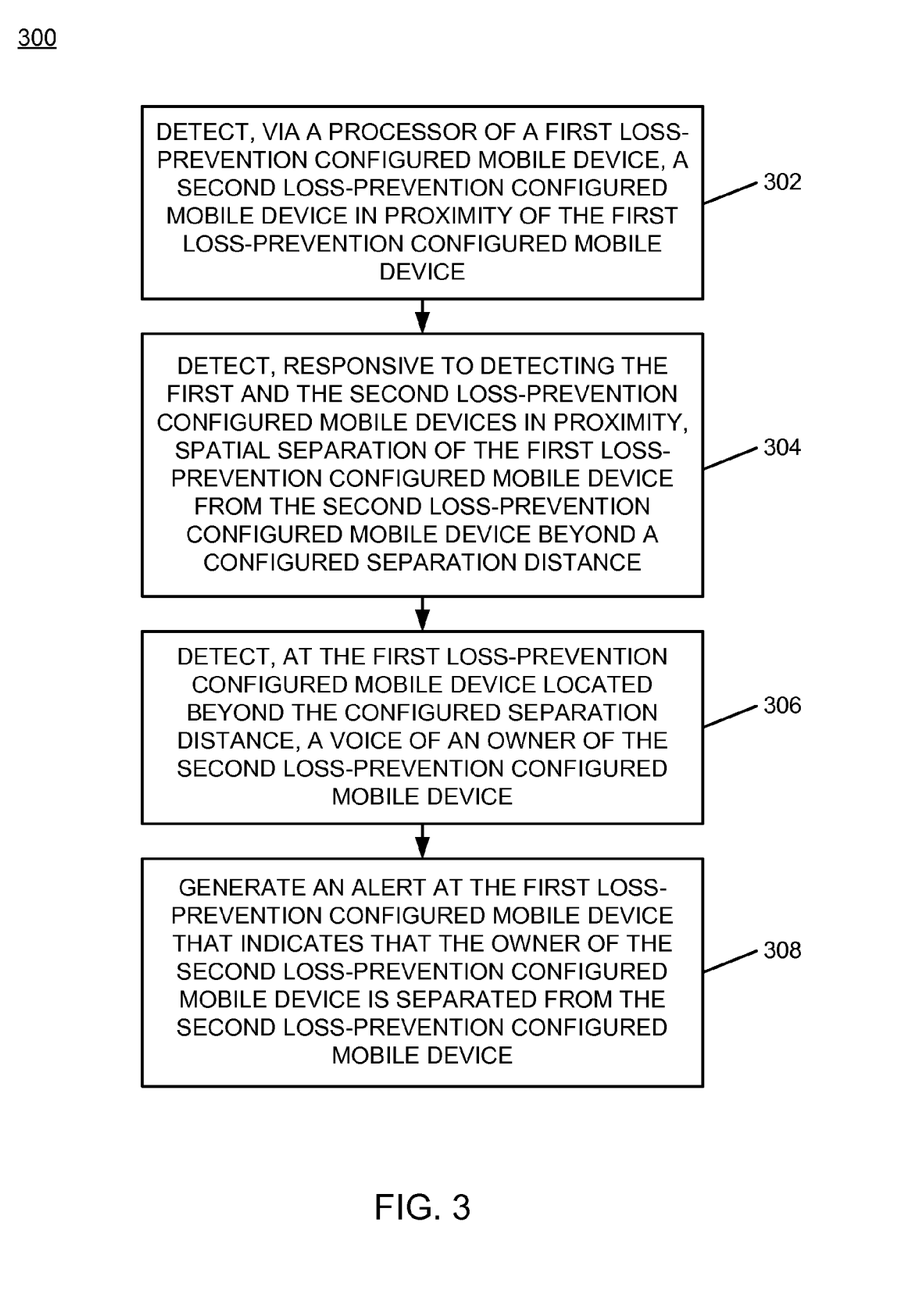
FIG. 3 is a flow chart of an example of an implementation of a process for mobile device loss prevention using audio and spatial indicia according to an embodiment of the present subject matter.
Figure 4:
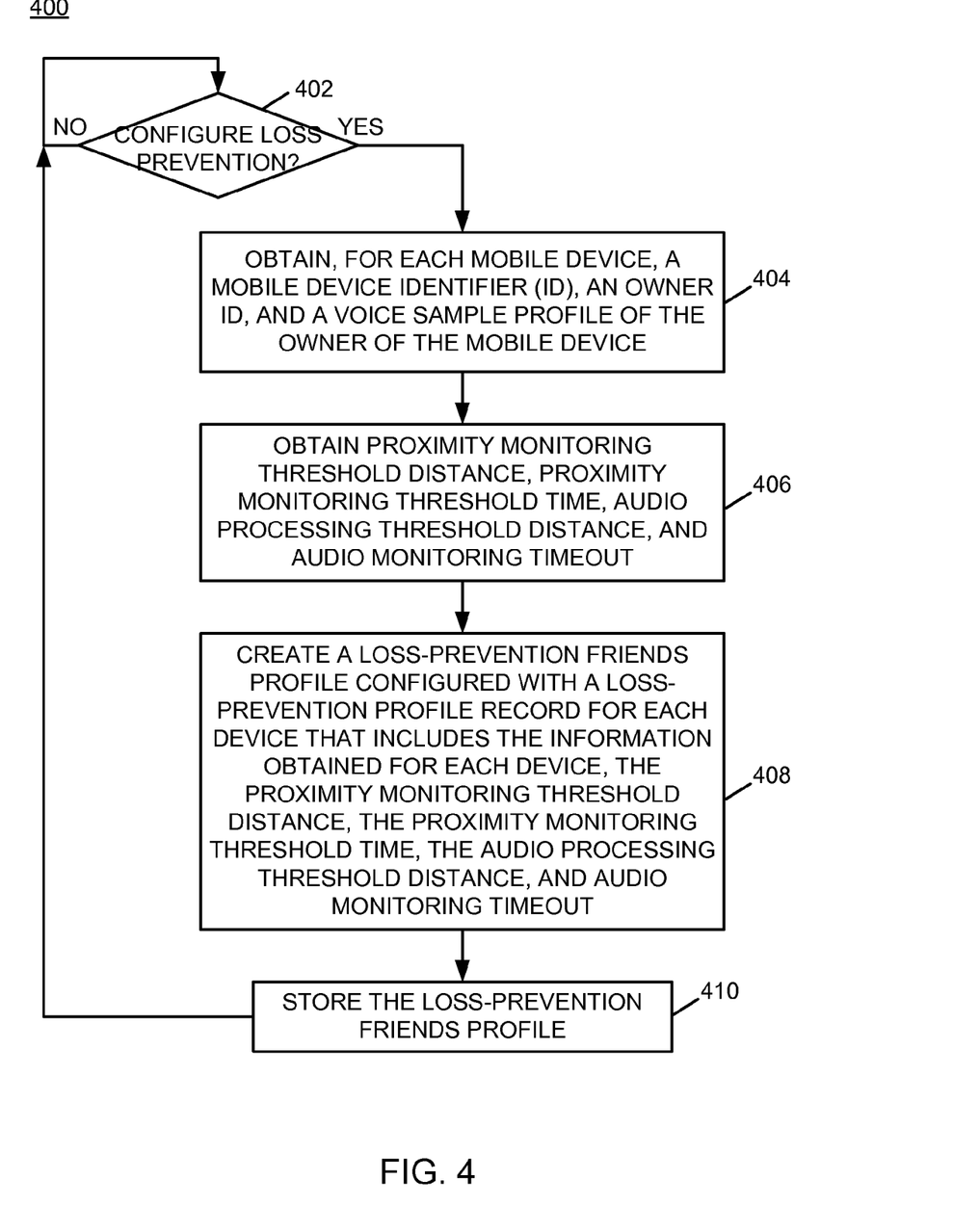
FIG. 4 is a flow chart of an example of an implementation of a process for configuring mobile device loss prevention using audio and spatial indicia according to an embodiment of the present subject matter.
Figure 5:
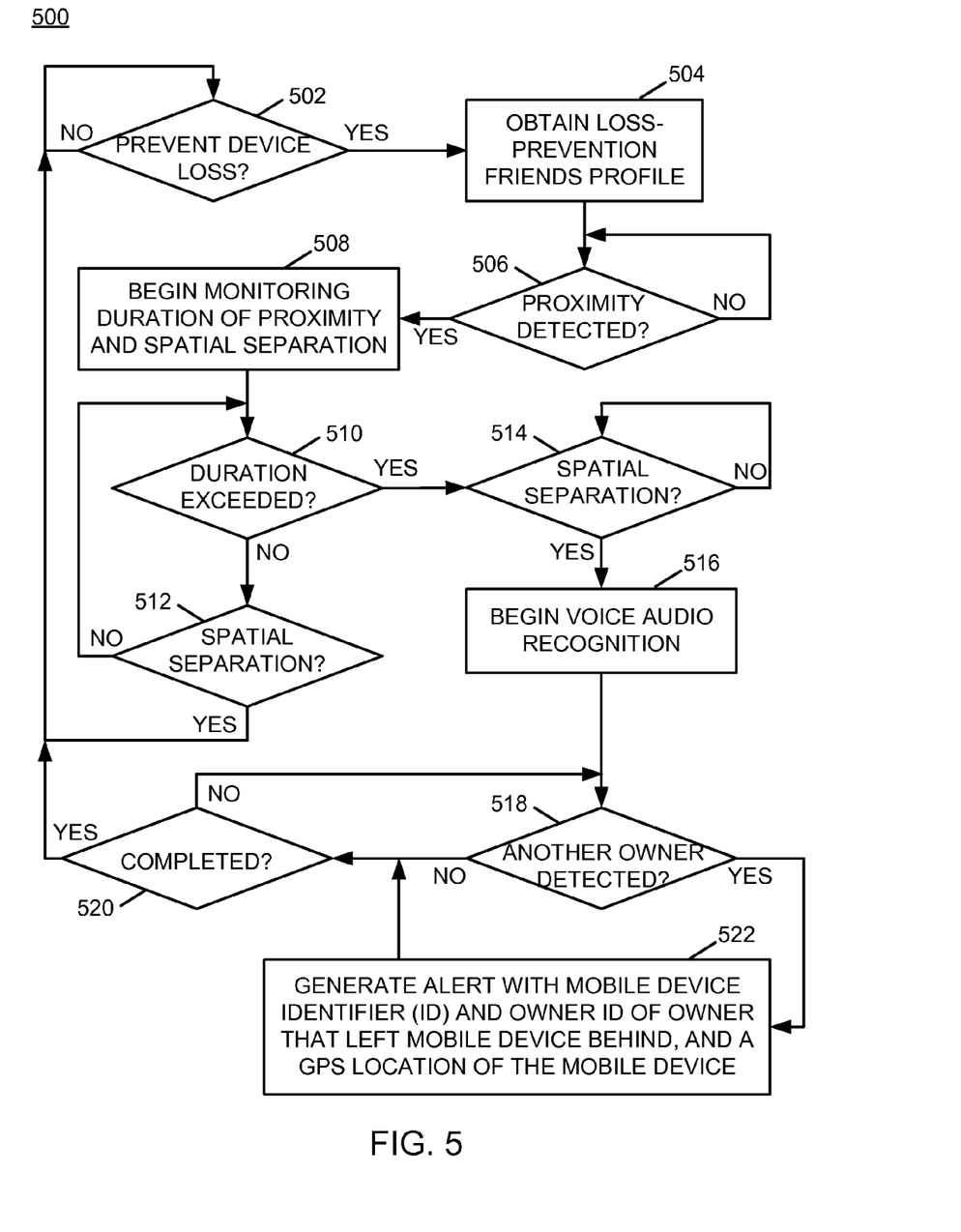
FIG. 5 is a flow chart of an example of an implementation of a process for monitoring for mobile device loss prevention using audio and spatial indicia according to an embodiment of the present subject matter.

FIG. 3 through FIG. 5 described below represent example processes that may be executed by devices, such as the core processing module 200, to perform the automated mobile device loss prevention using audio and spatial indicia associated with the present subject matter. Many other variations on the example processes are possible and all are considered within the scope of the present subject matter. The example processes may be performed by modules, such as the audio-based loss-prevention module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for mobile device loss prevention using audio and spatial indicia. The process 300 represents a processor-implemented method of preventing loss of a mobile device described herein. At block 302, the process 300 detects, via a processor of a first loss-prevention configured mobile device, a second loss-prevention configured mobile device in proximity of the first loss-prevention configured mobile device. At block 304, the process 300 detects, responsive to detecting the first and the second loss-prevention configured mobile devices in proximity, spatial separation of the first loss-prevention configured mobile device from the second loss-prevention configured mobile device beyond a configured separation distance. At block 306, the process 300 detects, at the first loss-prevention configured mobile device located beyond the configured separation distance, a voice of an owner of the second loss-prevention configured mobile device. At block 308, the process 300 generates an alert at the first loss-prevention configured mobile device that indicates that the owner of the second loss-prevention configured mobile device is separated from the second loss-prevention configured mobile device.

FIG. 4 is a flow chart of an example of an implementation of a process 400 for configuring mobile device loss prevention using audio and spatial indicia. The process 400 represents a processor-implemented method of configuring the audio-based loss prevention described herein. At decision point 402, the process 400 makes a determination as to whether a request to configure loss prevention for a set of mobile devices has been detected. For example, a group of friends may initiate a request to configure their mobile devices to be managed under a loss-prevention friends profile. In response to determining that a request to configure loss prevention for a set of mobile devices has been detected, the process 400 obtains, for each mobile device, a mobile device identifier (ID), an owner ID, and a voice sample profile of the owner of the respective mobile device at block 404. The voice sample profile may include capturing a fast Fourier transform (FFT) or other technology-based frequency spectrum of the user's spoken voice that provides frequency-based characteristics of the user's spoken voice that may be detected, specific spoken words that may be detected (e.g., where a user uses contractions or does not use contractions within speech, always says "Bye Guys," or other specific phrases), or may include other indicia usable to identify the unique voice of the respective mobile device owner. As such, audio indicia configured within the voice sample profile may combine frequency-based and specific word-based recognition of a voice, which is different from speech recognition that attempts to capture all words spoken such as for purposes of transcription. However, as described above the voice sample profile may be used in certain aspects to recognize spoken words that have been configured within the voice sample profile to identify the specific user.

At block 406, the process 400 obtains a proximity monitoring threshold distance, a proximity monitoring threshold time, an audio processing threshold distance, and an audio monitoring timeout. For example, and as described above, the friends/users may specify that processing for loss prevention is to begin where their mobile devices are in proximity within a proximity monitoring threshold distance (e.g., ten feet, twenty feet, fifty feet, etc.) for a proximity monitoring threshold time (e.g., monitor when in proximity for at least two minutes, three minutes, five minutes, ten minutes, etc.). Once the monitoring proximity and time thresholds are met, the users may also specify audio processing threshold distance of spatial separation that triggers audio processing to detect owners' voices near mobile devices of friends. The specified distance of spatial separation may be the same distance or a different distance relative to the proximity monitoring threshold distance described above. As an example of different threshold distances, where the monitoring threshold distance is set to ten feet and the devices are considered to be in proximity for the respective specified proximity monitoring threshold time, the specified audio processing threshold distance of spatial separation may be set to a distance larger than the maximum threshold distance (e.g., fifteen feet, twenty feet, fifty feet etc.). By setting the audio processing threshold distance of spatial separation larger than the proximity monitoring threshold distance, monitoring of audio may be avoided in circumstances where the friends are at a gathering and move into and out of the proximity monitoring threshold distance without actually leaving the gathering. An audio monitoring timeout may be used to specify a time beyond which to stop voice audio recognition, such as for example, after five minutes, after ten minutes, etc. A configured audio monitoring timeout may be used to specify a critical time during which friends are saying their goodbyes while walking to their vehicles when they have left one or more mobile devices behind, while avoiding audio monitoring after it is likely that another owner's voice would be detected if it hasn't already been detected.

At block 408, the process 400 creates a loss-prevention friends profile configured with a loss-prevention profile record for each mobile device that includes the information obtained for each device (e.g., the mobile device identifier (ID), an owner ID, and a voice sample profile of the owner of the respective mobile device), the proximity monitoring threshold distance, the proximity monitoring threshold time, the audio processing threshold distance, and the audio monitoring timeout. At block 410, the process 400 stores the created loss-prevention friends profile, such as to the loss-prevention database 110. The process 400 returns to decision point 402 and iterates as described above.

As such, the process 400 allows a group of friends that are users of mobile devices to configure situational thresholds of proximity and time for invoking processing to prevent loss of the mobile devices of the friends. The process 400 also captures audio voice samples of the owners that may be used in conjunction with the owner and mobile device IDs to alert users when a voice of an owner of a different mobile device is detected beyond the configured audio processing threshold distance after the friends have gathered and are now leaving the location of the gathering.

FIG. 5 is a flow chart of an example of an implementation of a process 500 for monitoring for mobile device loss prevention using audio and spatial indicia. The process 500 represents a processor-implemented method of performing the monitoring of proximity, time and audio to prevent mobile device loss as described herein. At decision point 502, the process 500 makes a determination as to whether to begin processing to prevent mobile device loss. For example, a default setting may be to always perform the processing to prevent mobile device loss, and the determination may be made at power up of the respective devices. Alternatively, the processing to prevent mobile device loss may be a selectable option that the respective mobile device users may enable and disable for meetings or other gatherings. In response to determining at decision point 502 to begin processing to prevent mobile device loss, the process 500 obtains a loss-prevention friends profile, such as from the loss-prevention database 110 at block 504. As described above, the loss-prevention friends profile includes the mobile device identifier (ID) of each loss-prevention configured mobile device owned by a set of friends, an owner ID of each loss-prevention configured mobile device, and a voice sample profile of the owner of each respective loss-prevention configured mobile device, and includes configured/specified thresholds of proximity and time (e.g., a proximity monitoring threshold distance, a proximity monitoring threshold time, an audio processing threshold distance) for monitoring to prevent mobile device loss, and an audio monitoring timeout.

At decision point 506, the process 500 makes a determination as to whether proximity of at least two loss-prevention configured mobile devices configured within the loss-prevention friends profile has been detected. The determination at decision point 506 may be based upon the configured proximity monitoring threshold distance within the loss-prevention friends profile, and may utilize GPS coordinates of the mobile devices, such as GPS coordinates derived from the GPS module 216.

In response to determining at decision point 506 that proximity of at least two mobile devices configured within the loss-prevention friends profile has been detected, the process 500 begins monitoring duration of the detected proximity and spatial separation of the mobile devices at block 508. Monitoring of the time duration of the detected proximity and spatial separation of the mobile devices may be performed by use of the timer/clock module 218 and the GPS module 216, respectively. At decision point 510, the process 500 makes a determination as to whether the configured proximity monitoring threshold time has expired while the mobile devices are in proximity. In response to determining that the configured proximity monitoring threshold time has not been met, the process 500 makes a determination at decision point 512 as to whether the mobile devices have spatially separated beyond the configured audio processing threshold distance before expiration of the configured proximity monitoring threshold time. The mobile devices moving beyond the configured audio processing threshold distance prior to expiration of the configured proximity monitoring threshold time avoids monitoring of audio under circumstances that do not meet the criteria established by the users within the loss-prevention friends profile (e.g., just meeting in a hallway briefly, etc.).

In response to determining at decision point 512 that the mobile devices have spatially separated beyond the configured audio processing threshold distance before expiration of the configured proximity monitoring threshold time, the process 500 returns to decision point 502 and iterates as described above. Alternatively, in response to determining at decision point 512 that the mobile devices have not spatially separated beyond the configured audio processing threshold distance before expiration of the configured proximity monitoring threshold time, the process 500 again makes a determination at decision point 510 as to whether the configured proximity monitoring threshold time has expired while the mobile devices are in proximity.

In response to determining at decision point 510 that the configured proximity monitoring threshold time has expired while the mobile devices are in proximity, the process 500 makes a determination at decision point 514 as to whether the mobile devices have spatially separated beyond the configured audio processing threshold distance (e.g., after expiration of the configured proximity monitoring threshold time). The process 500 continues to monitor spatial separation of the mobile devices at decision point 514. In response to determining at decision point 514 that the mobile devices have spatially separated beyond the configured audio processing threshold distance, the process 500 begins voice audio recognition processing at block 516, such as by use of the voice recognition module 220.

The process 500 begins iterative processing at decision point 518 and makes a determination as to whether a voice of an owner of a different mobile device is detected by a mobile device of a friend while the friend's mobile device is physically separated from the owner's mobile device. In response to determining that a voice of an owner of a different mobile device is not detected by a mobile device of a friend while the friend's mobile device is physically separated from the owner's mobile device, the process 500 makes a determination at decision point 520 as to whether processing is completed, such as by user selection or by the monitoring time reaching the audio monitoring timeout. Alternatively, users may disable the monitoring by a selection to complete the processing. In response to determining that processing is not completed at decision point 520, the process 500 returns to decision point 518 and iterates as described above.

In response to determining at decision point 518 that a voice of an owner of a different mobile device is detected by a mobile device of a friend while the friend's mobile device is physically separated from the owner's mobile device, the process 500 generates an alert at block 522 with a mobile device identifier (ID) and owner ID of the owner that left the mobile device behind, and a GPS location of the mobile device. The GPS location of the device may be useful for locating where the owner left the mobile device. Alternatively, the GPS location may specify where the mobile device was subsequently moved, such as if a server in a restaurant finds the mobile device and gives the mobile device to the manager for safe keeping. The friend that owns the mobile device that receives the alert may then notify the owner that the owner left the mobile device behind before the mobile device is actually lost. The process 500 returns to decision point 520 and iterates as described above. In response to determining that processing is completed at decision point 520, the process 500 returns to decision point 502 and iterates as described above.

As such, the process 500 protects against mobile device loss by using a variety of configured threshold distances and times, with coincident audio voice detection, to detect circumstances under which an owner of a mobile device has left the mobile device behind. The process 500 operates to prevent mobile device loss by generating an appropriate alert before the mobile device is actually lost.

As described above in association with FIG. 1 through FIG. 5, the example systems and processes provide mobile device loss prevention using audio and spatial indicia. Many other variations and additional activities associated with mobile device loss prevention using audio and spatial indicia are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
    detecting, via a processor of a first loss-prevention configured mobile device, a second loss-prevention configured mobile device in proximity of the first loss-prevention configured mobile device;
    detecting, responsive to detecting the first and the second loss-prevention configured mobile devices in proximity, spatial separation of the first loss-prevention configured mobile device from the second loss-prevention configured mobile device beyond a configured separation distance;
    detecting, at the first loss-prevention configured mobile device located beyond the configured separation distance, a voice of an owner of the second loss-prevention configured mobile device; and
    generating an alert at the first loss-prevention configured mobile device that indicates that the owner of the second loss-prevention configured mobile device is separated from the second loss-prevention configured mobile device.

2. The method of claim 1, further comprising configuring a loss-prevention friends profile comprising:
    for each of at least the first and the second loss-prevention configured mobile devices:
        a loss-prevention profile record that comprises a user identifier (ID) of an owner of the respective loss-prevention configured mobile device, a voice sample profile of the respective owner, and a mobile device identifier (ID) of the respective loss-prevention configured mobile device.

3. The method of claim 1, where:
    detecting, via the processor of the first loss-prevention configured mobile device, the second loss-prevention configured mobile device in proximity of the first loss-prevention configured mobile device comprises:
        detecting the second loss-prevention configured mobile device in proximity of the first loss-prevention configured mobile device for a configured duration of time specified within a loss-prevention friends profile, where the configured duration of time comprises a proximity monitoring threshold time to begin monitoring to detect spatial separation of the first and the second loss-prevention configured mobile devices beyond the configured separation distance; and
    detecting, responsive to detecting the first and the second loss-prevention configured mobile devices in proximity, the spatial separation of the first loss-prevention configured mobile device from the second loss-prevention configured mobile device beyond the configured separation distance comprises:
  detecting, responsive to detecting the second loss-prevention configured mobile device in proximity for the configured duration of time, the spatial separation of the first and the second loss-prevention configured mobile devices beyond an audio processing threshold distance specified within the loss-prevention friends profile.

4. The method of claim 1, where the configured separation distance is specified within a loss-prevention friends profile as an audio processing threshold distance, and where:
  detecting, responsive to detecting the first and the second loss-prevention configured mobile devices in proximity, the spatial separation of the first loss-prevention configured mobile device from the second loss-prevention configured mobile device beyond the configured separation distance comprises:
    obtaining the audio processing threshold distance specified within the loss-prevention friends profile;
    monitoring relative locations of the first and the second loss-prevention configured mobile devices; and
    detecting movement of at least one of the first and the second loss-prevention configured mobile devices that results in the at least two loss-prevention configured mobile devices spatially separating beyond the audio processing threshold distance.

5. The method of claim 1, where detecting, at the first loss-prevention configured mobile device located beyond the configured separation distance, the voice of the owner of the second loss-prevention configured mobile device comprises:
  capturing audio detected by the first loss-prevention configured mobile device;
  performing voice recognition of the captured audio; and
  determining that a recognized voice within the captured audio matches a voice sample profile of the owner of the second loss-prevention configured mobile device.

6. The method of claim 5, further comprising obtaining a loss-prevention friends profile configured with voice sample profiles of at least the owner of the second loss-prevention configured mobile device, and where:
  determining that the recognized voice within the captured audio matches the voice sample profile of the owner of the second loss-prevention configured mobile device comprises:
    comparing the recognized voice sequentially to the voice sample profiles configured within the loss-prevention friends profile; and
    determining that the recognized voice matches one of the voice sample profiles within the loss-prevention friends profile.

7. The method of claim 1, where:
  detecting, at the first loss-prevention configured mobile device located beyond the configured separation distance, the voice of the owner of the second loss-prevention configured mobile device comprises:
    identifying a voice sample profile of the owner of the second loss-prevention configured mobile device configured within a loss-prevention friends profile using a recognized voice identified within audio captured by the first loss-prevention configured mobile device; and
    retrieving, from the loss-prevention friends profile, an owner identifier (ID) of the owner and a mobile device identifier (ID) of the second loss-prevention configured mobile device correlated with the recognized voice; and
  generating the alert at the first loss-prevention configured mobile device that indicates that the owner of the second loss-prevention configured mobile device is separated from the second loss-prevention configured mobile device comprises:
    generating the alert with output comprising the owner ID of the owner of the second loss-prevention configured mobile device, the mobile device ID of the second loss-prevention configured mobile device, and a global positioning system (GPS) location of the second loss-prevention configured mobile device.

8. A system, comprising:
an output device; and
a processor of a first loss-prevention configured mobile device programmed to:
  detect a second loss-prevention configured mobile device in proximity of the first loss loss-prevention configured mobile device;
  detect, responsive to detecting the first and the second loss-prevention configured mobile devices in proximity, spatial separation of the first loss-prevention configured mobile device from the second loss-prevention configured mobile device beyond a configured separation distance;
  detect via the first loss-prevention configured mobile device located beyond the configured separation distance, a voice of an owner of the second loss-prevention configured mobile device; and
  generate, using the output device, an alert at the first loss-prevention configured mobile device that indicates that the owner of the second loss-prevention configured mobile device is separated from the second loss-prevention configured mobile device.

9. The system of claim 8, where the processor of the first loss-prevention configured mobile device is further programmed to configure a loss-prevention friends profile comprising:
  for each of at least the first and the second loss-prevention configured mobile devices:
    a loss-prevention profile record that comprises a user identifier (ID) of an owner of the respective loss-prevention configured mobile device, a voice sample profile of the respective owner, and a mobile device identifier (ID) of the respective loss-prevention configured mobile device.

10. The system of claim 8, where, in being programmed to:
  detect the second loss-prevention configured mobile device in proximity of the first loss-prevention configured mobile device, the processor of the first loss-prevention configured mobile device is programmed to:
    detect the second loss-prevention configured mobile device in proximity of the first loss-prevention configured mobile device for a configured duration of time specified within a loss-prevention friends profile, where the configured duration of time comprises a proximity monitoring threshold time to begin monitoring to detect spatial separation of the first and the second loss-prevention configured mobile devices beyond the configured separation distance; and
  detect, responsive to detecting the first and the second loss-prevention configured mobile devices in proximity, the spatial separation of the first loss-prevention configured mobile device from the second loss-prevention configured mobile device beyond the configured separation distance, the processor of the first loss-prevention configured mobile device is programmed to:
    detect, responsive to detecting the second loss-prevention configured mobile device in proximity for the configured duration of time, the spatial separation of the first and the second loss-prevention configured mobile devices beyond an audio processing threshold distance specified within the loss-prevention friends profile.

11. The system of claim 8, where the configured separation distance is specified within a loss-prevention friends profile as an audio processing threshold distance, and where, in being programmed to:
    detect, responsive to detecting the first and the second loss-prevention configured mobile devices in proximity, the spatial separation of the first loss-prevention configured mobile device from the second loss-prevention configured mobile device beyond the configured separation distance, the processor of the first loss-prevention configured mobile device is programmed to:
        obtain the audio processing threshold distance specified within the loss-prevention friends profile;
        monitor relative locations of the first and the second loss-prevention configured mobile devices; and
        detect movement of at least one of the first and the second loss-prevention configured mobile devices that results in the at least two loss-prevention configured mobile devices spatially separating beyond the audio processing threshold distance.

12. The system of claim 8, where, in being programmed to detect, via the first loss-prevention configured mobile device located beyond the configured separation distance, the voice of the owner of the second loss-prevention configured mobile device, the processor of the first loss-prevention configured mobile device is programmed to:
    capture audio detected by the first loss-prevention configured mobile device;
    obtain a loss-prevention friends profile configured with voice sample profiles of at least the owner of the second loss-prevention configured mobile device;
    perform voice recognition of the captured audio;
    compare the recognized voice sequentially to the voice sample profiles configured within the loss-prevention friends profile; and
    determine that the recognized voice matches one of the voice sample profiles within the loss-prevention friends profile.

13. The system of claim 8, where, in being programmed to:
    detect, via the first loss-prevention configured mobile device located beyond the configured separation distance, the voice of the owner of the second loss-prevention configured mobile device, the processor of the first loss-prevention configured mobile device is programmed to:
        identify a voice sample profile of the owner of the second loss-prevention configured mobile device configured within a loss-prevention friends profile using a recognized voice identified within audio captured by the first loss-prevention configured mobile device; and
        retrieve, from the loss-prevention friends profile, an owner identifier (ID) of the owner and a mobile device identifier (ID) of the second loss-prevention configured mobile device correlated with the recognized voice; and
    generate, using the output device, the alert at the first loss-prevention configured mobile device that indicates that the owner of the second loss-prevention configured mobile device is separated from the second loss-prevention configured mobile device, the processor of the first loss-prevention configured mobile device is programmed to:
        generate, using the output device, the alert with output comprising the owner ID of the owner of the second loss-prevention configured mobile device, the mobile device ID of the second loss-prevention configured mobile device, and a global positioning system (GPS) location of the second loss-prevention configured mobile device.

14. A computer program product, comprising:
    a computer readable storage medium having computer readable program code embodied therewith, where the computer readable storage medium is not a transitory signal per se and where the computer readable program code when executed on a computer causes the computer to:
        detect, via a first loss-prevention configured mobile device, a second loss-prevention configured mobile device in proximity of the first loss-prevention configured mobile device;
        detect, responsive to detecting the first and the second loss-prevention configured mobile devices in proximity, spatial separation of the first loss-prevention configured mobile device from the second loss-prevention configured mobile device beyond a configured separation distance;
        detect, at the first loss-prevention configured mobile device located beyond the configured separation distance, a voice of an owner of the second loss-prevention configured mobile device; and
        generate an alert at the first loss-prevention configured mobile device that indicates that the owner of the second loss-prevention configured mobile device is separated from the second loss-prevention configured mobile device.

15. The computer program product of claim 14, where the computer readable program code when executed on the computer further causes the computer to configure a loss-prevention friends profile comprising:
    for each of at least the first and the second loss-prevention configured mobile devices:
        a loss-prevention profile record that comprises a user identifier (ID) of an owner of the respective loss-prevention configured mobile device, a voice sample profile of the respective owner, and a mobile device identifier (ID) of the respective loss-prevention configured mobile device.

16. The computer program product of claim 14, where, in causing the computer to:
    detect, via the first loss-prevention configured mobile device, the second loss-prevention configured mobile device in proximity of the first loss-prevention configured mobile device, the computer readable program code when executed on the computer causes the computer to:
        detect the second loss-prevention configured mobile device in proximity of the first loss-prevention configured mobile device for a configured duration of time specified within a loss-prevention friends profile, where the configured duration of time comprises a proximity monitoring threshold time to begin monitoring to detect spatial separation of the first and the second loss-prevention configured mobile devices beyond the configured separation distance; and detect, responsive to detecting the first and the second loss-prevention configured mobile devices in proximity, the spatial separation of the first loss-prevention configured mobile device from the second loss-prevention configured mobile device beyond the configured separation distance, the computer readable program code when executed on the computer causes the computer to:

detect, responsive to detecting the second loss-prevention configured mobile device in proximity for the configured duration of time, the spatial separation of the first and the second loss-prevention configured mobile devices beyond an audio processing threshold distance specified within the loss-prevention friends profile.

17. The computer program product of claim 14, where the configured separation distance is specified within a loss-prevention friends profile as an audio processing threshold distance, and where, in causing the computer to:

detect, responsive to detecting the first and the second loss-prevention configured mobile devices in proximity, the spatial separation of the first loss-prevention configured mobile device from the second loss-prevention configured mobile device beyond the configured separation distance, the computer readable program code when executed on the computer causes the computer to:

obtain the audio processing threshold distance specified within the loss-prevention friends profile;

monitor relative locations of the first and the second loss-prevention configured mobile devices; and detect movement of at least one of the first and the second loss-prevention configured mobile devices that results in the at least two loss-prevention configured mobile devices spatially separating beyond the audio processing threshold distance.

18. The computer program product of claim 14, where, in causing the computer to detect, at the first loss-prevention configured mobile device located beyond the configured separation distance, the voice of the owner of the second loss-prevention configured mobile device, the computer readable program code when executed on the computer causes the computer to:

capture audio detected by the first loss-prevention configured mobile device;

perform voice recognition of the captured audio; and determine that a recognized voice within the captured audio matches a voice sample profile of the owner of the second loss-prevention configured mobile device.

19. The computer program product of claim 18, where the computer readable program code when executed on the computer further causes the computer to obtain a loss-prevention friends profile configured with voice sample profiles of at least the owner of the second loss-prevention configured mobile device, and where, in causing the computer to:

determine that the recognized voice within the captured audio matches the voice sample profile of the owner of the second loss-prevention configured mobile device, the computer readable program code when executed on the computer causes the computer to:

compare the recognized voice sequentially to the voice sample profiles configured within the loss-prevention friends profile; and determine that the recognized voice matches one of the voice sample profiles within the loss-prevention friends profile.

20. The computer program product of claim 14, where, in causing the computer to:

detect, at the first loss-prevention configured mobile device located beyond the configured separation distance, the voice of the owner of the second loss-prevention configured mobile device, the computer readable program code when executed on the computer causes the computer to:

identify a voice sample profile of the owner of the second loss-prevention configured mobile device configured within a loss-prevention friends profile using a recognized voice identified within audio captured by the first loss-prevention configured mobile device; and retrieve, from the loss-prevention friends profile, an owner identifier (ID) of the owner and a mobile device identifier (ID) of the second loss-prevention configured mobile device correlated with the recognized voice; and generate the alert at the first loss-prevention configured mobile device that indicates that the owner of the second loss-prevention configured mobile device is separated from the second loss-prevention configured mobile device, the computer readable program code when executed on the computer causes the computer to:

generate the alert with output comprising the owner ID of the owner of the second loss-prevention configured mobile device, the mobile device ID of the second loss-prevention configured mobile device, and a global positioning system (GPS) location of the second loss-prevention configured mobile device.

* * * * *